(12) United States Patent
Drozdenko et al.

(10) Patent No.: US 11,002,285 B2
(45) Date of Patent: May 11, 2021

(54) FAN BLADE ATTACHMENT ROOT WITH IMPROVED STRAIN RESPONSE

(71) Applicant: Raytheon Technologies Corporation, Farmington, CT (US)

(72) Inventors: Lee Drozdenko, Bristol, CT (US); William R. Graves, Manchester, CT (US); Michael Li, Madison, CT (US); Maria C. Kirejczyk, Middletown, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/012,940

(22) Filed: Sep. 4, 2020

(65) Prior Publication Data
US 2020/0400159 A1    Dec. 24, 2020

Related U.S. Application Data

(62) Division of application No. 16/245,484, filed on Jan. 11, 2019, now Pat. No. 10,801,515, which is a
(Continued)

(51) Int. Cl.
*F04D 29/34* (2006.01)
*F01D 21/04* (2006.01)
(Continued)

(52) U.S. Cl.
CPC .............. *F04D 29/34* (2013.01); *F01D 5/30* (2013.01); *F01D 21/045* (2013.01); *F02C 3/04* (2013.01);
(Continued)

(58) Field of Classification Search
CPC . F01D 5/30; F01D 5/3007; F02C 3/04; F02K 3/06; F04D 29/322; F04D 29/34;
(Continued)

(56) References Cited

U.S. PATENT DOCUMENTS 5,100,292 A  *  3/1992  Matula ...................... F01D 5/30
                                                      416/220 R
RE33,954 E      6/1992  Honda et al.
(Continued)

FOREIGN PATENT DOCUMENTS

EP       1136654       9/2001
EP       2907971       8/2015
(Continued)

OTHER PUBLICATIONS

European Patent Office, European Search Report dated Nov. 18, 2019 in Application No. 19190620.5.
(Continued)

*Primary Examiner* — Jesse S Bogue
(74) *Attorney, Agent, or Firm* — Snell & Wilmer L.L.P.

(57) ABSTRACT

A fan blade is provided and comprises a leading edge, an attachment root extending aft of the leading edge, and a trench formed in a surface of the attachment root. An attachment root is also provided. The attachment root comprises a leading edge, a dovetail extending aft of the leading edge, and a trench formed in a surface of the dovetail. A gas turbine engine is also provided. The gas turbine engine comprises a compressor section configured to rotate about an axis, a combustor aft of the compressor section, and a turbine section aft of the compressor section and configured to rotate about the axis. A fan may be disposed forward of the turbine section and include a blade. The blade may have a trench formed in an attachment root.

3 Claims, 9 Drawing Sheets

Related U.S. Application Data division of application No. 15/075,705, filed on Mar. 21, 2016, now Pat. No. 10,400,784.

(60) Provisional application No. 62/167,100, filed on May 27, 2015.

(51) Int. Cl.

| | | |
|---|---|---|
| *F01D 5/30* | (2006.01) | |
| *F02C 3/04* | (2006.01) | |
| *F02K 3/06* | (2006.01) | |
| *F04D 29/38* | (2006.01) | |
| *F04D 29/32* | (2006.01) | |

(52) U.S. Cl.
CPC .............. *F02K 3/06* (2013.01); *F04D 29/322* (2013.01); *F04D 29/38* (2013.01); *F01D 5/3007* (2013.01); *F05D 2220/323* (2013.01); *F05D 2220/36* (2013.01); *F05D 2230/10* (2013.01); *F05D 2240/35* (2013.01); *F05D 2250/241* (2013.01); *F05D 2250/291* (2013.01); *F05D 2250/294* (2013.01); *F05D 2260/941* (2013.01)

(58) Field of Classification Search
CPC .............. F04D 29/38; F05D 2220/323; F05D 2220/36; F05D 2240/35; F05D 2260/941
See application file for complete search history.

(56) References Cited

U.S. PATENT DOCUMENTS

| | | | | |
|---|---|---|---|---|
| 5,314,307 | A * | 5/1994 | Farmer | F01D 21/045 |
| | | | | 416/2 |
| 5,431,542 | A | 7/1995 | Weisse et al. | |
| 5,435,694 | A * | 7/1995 | Kray | F01D 5/141 |
| | | | | 416/219 R |
| 6,065,938 | A * | 5/2000 | Bartsch | F01D 5/30 |
| | | | | 416/219 R |
| 6,739,837 | B2 | 5/2004 | Barnette et al. | |
| 6,786,696 | B2 | 9/2004 | Herman et al. | |
| 7,165,944 | B2 * | 1/2007 | Gautreau | F01D 5/16 |
| | | | | 416/219 R |
| 7,217,099 | B2 | 5/2007 | Casanova et al. | |
| 7,442,007 | B2 | 10/2008 | Bibor et al. | |
| 7,476,083 | B2 | 1/2009 | Snook et al. | |
| 7,686,585 | B2 * | 3/2010 | Buisson | F04D 29/322 |
| | | | | 416/220 R |
| 7,874,806 | B2 | 1/2011 | Phipps | |
| 8,727,733 | B2 | 5/2014 | Thermos | |
| 8,764,402 | B2 * | 7/2014 | Agaram | F01D 5/323 |
| | | | | 416/220 R |
| 9,506,356 | B2 * | 11/2016 | Loftus | F01D 5/3007 |
| 2013/0101422 | A1 | 4/2013 | Bullinger | |
| 2016/0040541 | A1 * | 2/2016 | Cosby | F01D 5/28 |
| | | | | 416/219 R |
| 2016/0186594 | A1 | 6/2016 | Healy | |

FOREIGN PATENT DOCUMENTS

| | | |
|---|---|---|
| WO | 2014133613 | 9/2014 |
| WO | 2014204542 | 12/2014 |

OTHER PUBLICATIONS

Extended European Search Report dated Oct. 13, 2016 in European Application No. 16171298.9.
European Patent Office, European Office Action dated Mar. 23, 2018 in Application No. 16171298.9-1006.
USPTO; Restriction Requirement Office Action dated Feb. 23, 2018 in U.S. Appl. No. 15/075,705.
USPTO; Pre-Interview First Office Action dated May 15, 2018 in U.S. Appl. No. 15/075,705.
USPTO; First Action Interview Office Action dated Jun. 22, 2018 in U.S. Appl. No. 15/075,705.
USPTO; Notice of Allowance dated Nov. 27, 2018 in U.S. Appl. No. 15/075,705.
USPTO; Notice of Allowance dated Jan. 9, 2019 in U.S. Appl. No. 15/075,705.
USPTO; Non-Final Office Action dated Feb. 28, 2020 in U.S. Appl. No. 16/245,484.
USPTO; Notice of Allowance dated Jun. 9, 2020 in U.S. Appl. No. 16/245,484.
European Patent Office, European Office Action dated Oct. 8, 2020 in Application No. 19190620.5.

* cited by examiner

FAN BLADE ATTACHMENT ROOT WITH IMPROVED STRAIN RESPONSE

CROSS-REFERENCE TO RELATED APPLICATIONS

This application is a divisional of, claims priority to, and the benefit of U.S. Ser. No. 16/245,484 filed on Jan. 11, 2019 entitled "FAN BLADE ATTACHMENT ROOT WITH IMPROVED STRAIN RESPONSE." The '484 application is a divisional of, claims priority to, and the benefit of U.S. Ser. No. 15/075,705 filed on Mar. 21, 2016 entitled "FAN BLADE ATTACHMENT ROOT WITH IMPROVED STRAIN RESPONSE." The '705 application is a nonprovisional of, and claims priority to, and the benefit of U.S. Provisional Application No. 62/167,100, entitled "FAN BLADE ATTACHMENT ROOT WITH IMPROVED STRAIN RESPONSE," filed on May 27, 2015." The contents of both are incorporated herein by reference in their entirety.

FIELD OF INVENTION

The present disclosure relates to gas turbine engines, and, more specifically, to a fan blade attachment root with an improved strain response to impact events.

BACKGROUND

Aircraft may collide with birds while in flight. In some instances, birds may collide with a gas turbine engine. In gas turbine engines having a fan, the fan blades may absorb the brunt of an impact. The impulse from impact may result in temporarily elevated strain in the fan blades. The area subjected to the increased strain may be the transition zone on the leading edge of the fan blade below the sheath. Stiff fan blades, for example, may be susceptible to damage at such area during an impact event.

SUMMARY

A fan blade may include a leading edge, an attachment root extending aft of the leading edge, and a trench formed in a surface of the attachment root. In various embodiments, the trench may comprise a cylindrical trough and an end surface having a spherical geometry. The trench may further comprise a first sidewall and a second sidewall parallel to the first sidewall with the first sidewall and the second sidewall extending tangentially from the cylindrical trough. The trench may comprise a spherical recess. The trench may be offset from the leading edge. A height of the trench equals a width of the trench. An axial length of the trench may be at least half an axial length of the attachment root. The surface of the attachment root may comprise a bottom surface of a dovetail.

An attachment root may comprise a leading edge, a dovetail extending aft of the leading edge, and a trench formed in a surface of the dovetail. In various embodiments, the trench may comprise a cylindrical trough and an end surface having a spherical geometry. The trench may further comprise a first sidewall and a second sidewall parallel to the first sidewall with the first sidewall and the second sidewall extend tangentially from the cylindrical trough. The trench may comprise a spherical recess. The trench is offset from the leading edge. A height of the trench may equal a width of the trench. An axial length of the trench may be at least half an axial length of the attachment root.

A gas turbine engine may comprise a compressor section configured to rotate about an axis, a combustor aft of the compressor section and a turbine section aft of the compressor section and configured to rotate about the axis. A fan may be disposed forward of the turbine section and include a blade. The blade may have a trench formed in an attachment root.

In various embodiments, the blade may comprise a leading edge with the trench extending aft from the leading edge. The trench may comprise a cylindrical trough and an end surface having a spherical geometry. A height of the trench may equal a width of the trench. The trench may comprise a cylindrical trough and an end surface having a spherical geometry.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
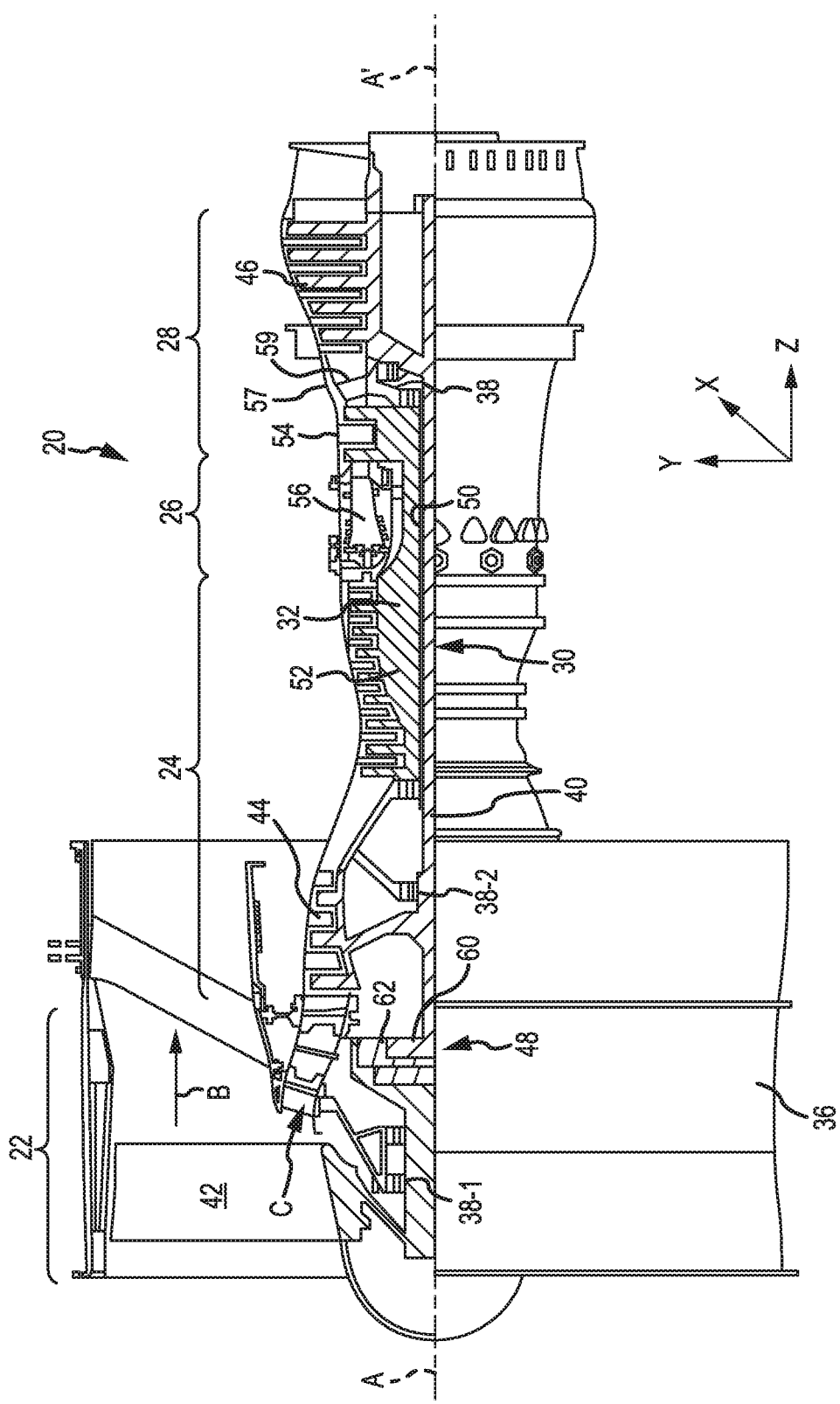
FIG. 1 illustrates an exemplary gas turbine engine, in accordance with various embodiments.

In various embodiments and with reference to FIG. 1, a gas-turbine engine 20 is provided. Gas-turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas-turbine engine 20 herein, it should be understood that the concepts described herein are not limited to use with turbofans as the teachings may be applied to other types of turbine engines including three-spool architectures.

Gas-turbine engine 20 may generally comprise a low speed spool 30 and a high speed spool 32 mounted for rotation about an engine central longitudinal axis A-A' relative to an engine static structure 36 via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2. In various embodiments, bearing system 38, bearing system 38-1, and bearing system 38-2 may be contained within a bearing housing and/or integrated into an oil delivery system, as described in further detail below.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor 52 and high pressure (or second) turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas-turbine engine 20 may be, for example, a high-bypass ratio geared aircraft engine. In various embodiments, the bypass ratio of gas-turbine engine 20 may be greater than about six (6). In various embodiments, the bypass ratio of gas-turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas-turbine engine 20 is greater than about ten (10:1). In various embodiments, the diameter of fan 42 may be significantly larger than that of the low pressure compressor section 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle.

Fan 42 may comprise blades 43 that rotate about the engine central longitudinal axis A-A'. Blades 43 may be airfoils coupled to a rotating hub by an attachment root. As described in further detail below, the attachment root of blades 43 may have trenches or recesses that increase flexibility of blades 43. In that regard, blades 43 with trenches may absorb impact while limiting damage from any resulting strain.

Figure 2A:
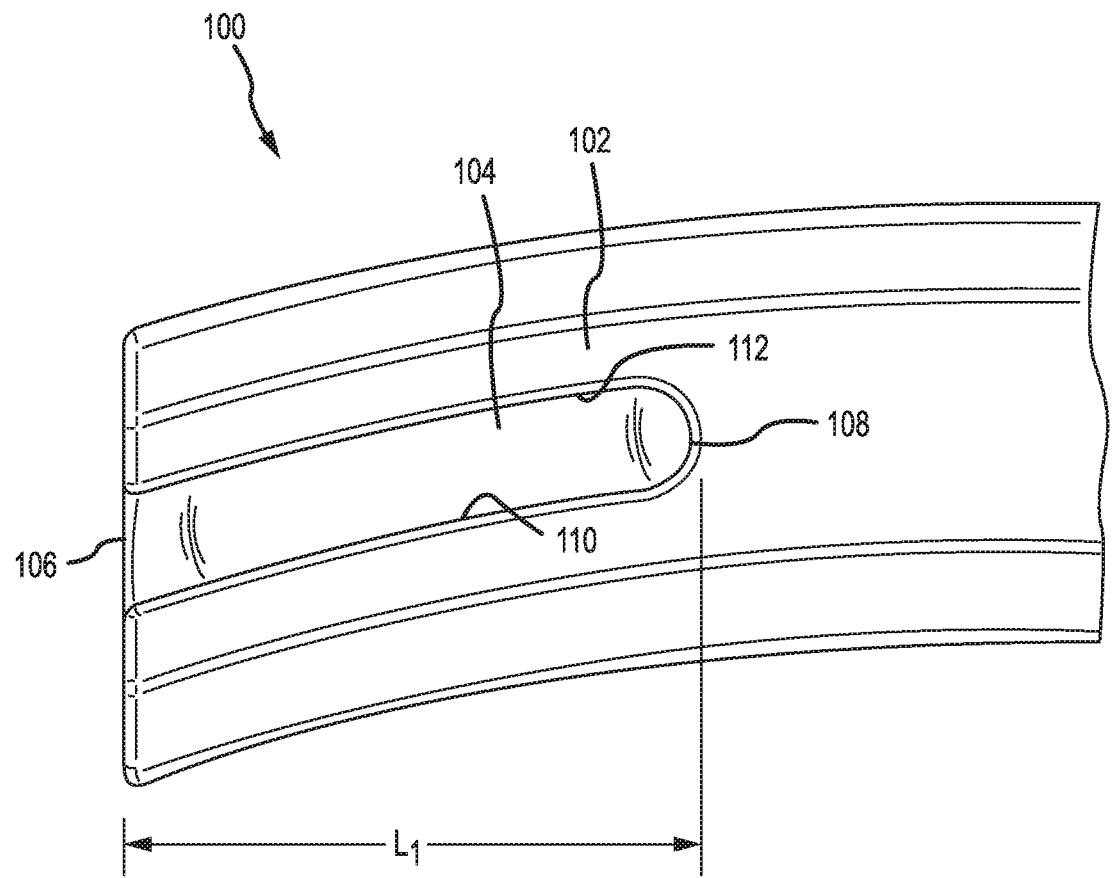
FIG. 2A illustrates an attachment root with a trench extending axially from a leading edge of the attachment root, in accordance with various embodiments.
Figure 2B:
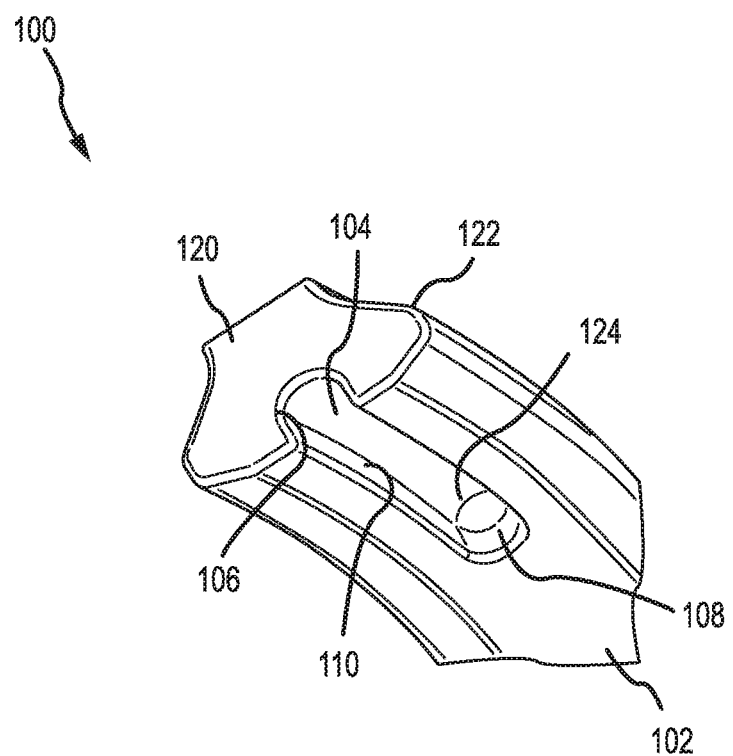
FIG. 2B illustrates a perspective view of an attachment root with a trench extending axially from a leading edge of the attachment root, in accordance with various embodiments.
Figure 2C:
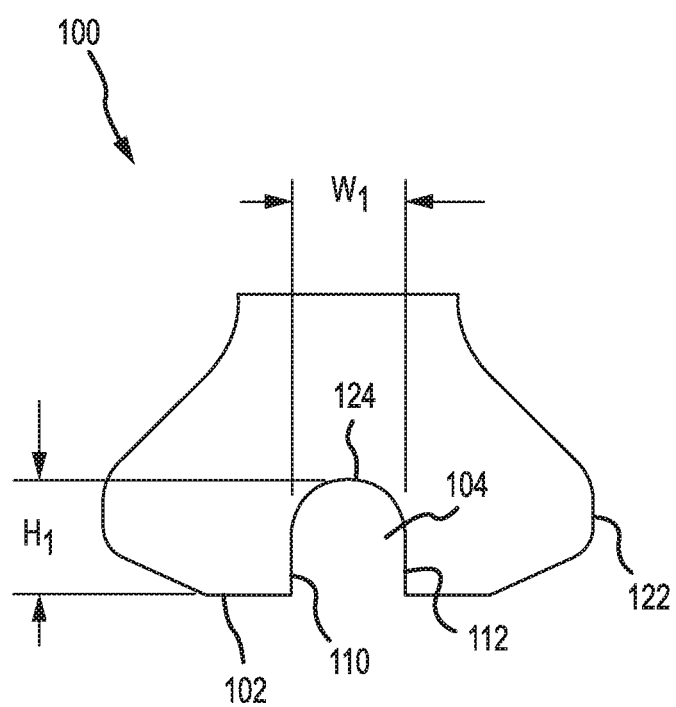
FIG. 2C illustrates a cross-sectional view of an attachment root with a trench, in accordance with various embodiments.

With reference to FIGS. 2A-2C, an attachment root 100 (e.g., of blade 43 of FIG. 1) is shown with a trench 104 formed in surface 102, in accordance with various embodiments. Attachment root 100 comprises a leading edge 106. Leading edge 106 may be disposed in a forward position relative to other portions of attachment root 100 when a blade is installed in an engine, with the remainder of attachment root 100 extending aft of leading edge 106. Trench 104 may thus be a recess extending aft from leading edge 106 in surface 102. Trench 104 may be a recess formed in a surface 102 of attachment root 100. Sidewall 112 may have a convex geometry matching the geometry of surface 102. Similarly, sidewall 110 may have a concave geometry matching the geometry of surface 102. In that regard, sidewall 110 and sidewall 112 may be spaced a uniform distance from the edge of surface 102. Trench 104 may have an end surface 108 disposed at an interior area of surface 102. Trench 104 may extend a length $L_1$ in an axial direction.

In various embodiments, attachment root 100 may comprise leading surface 120 at leading edge 106 of attachment root 100. A dovetail 122 of attachment root 100 may flare out in a circumferential direction to provide a contact surface and retain blade 43 using a dovetail-type joint. Trench 104 may comprise a cylindrical trough 124 formed in surface 102 (i.e., the bottom surface of dovetail 122) and terminating at end surface 108 having a spherical geometry. Cylindrical trough 124 may have a width $W_1$ and join sidewall 110 and sidewall 112, with each sidewall extending tangentially away from cylindrical trough 124 and sidewall 110 being parallel to sidewall 112. Sidewall 112 and sidewall 110 may be oriented orthogonally to surface 102. Trench 104 may have a height Hi from surface 102 into attachment root 100. The rounded contour of cylindrical trough 124 and the spherical contour of end surface 108 may limit stress concentrations in trench 104. However, trench 104 may be rectangular, trapezoidal, triangular, multi-radial, or any other shape to reduce strain concentrations resulting from impact events.

Figure 3:
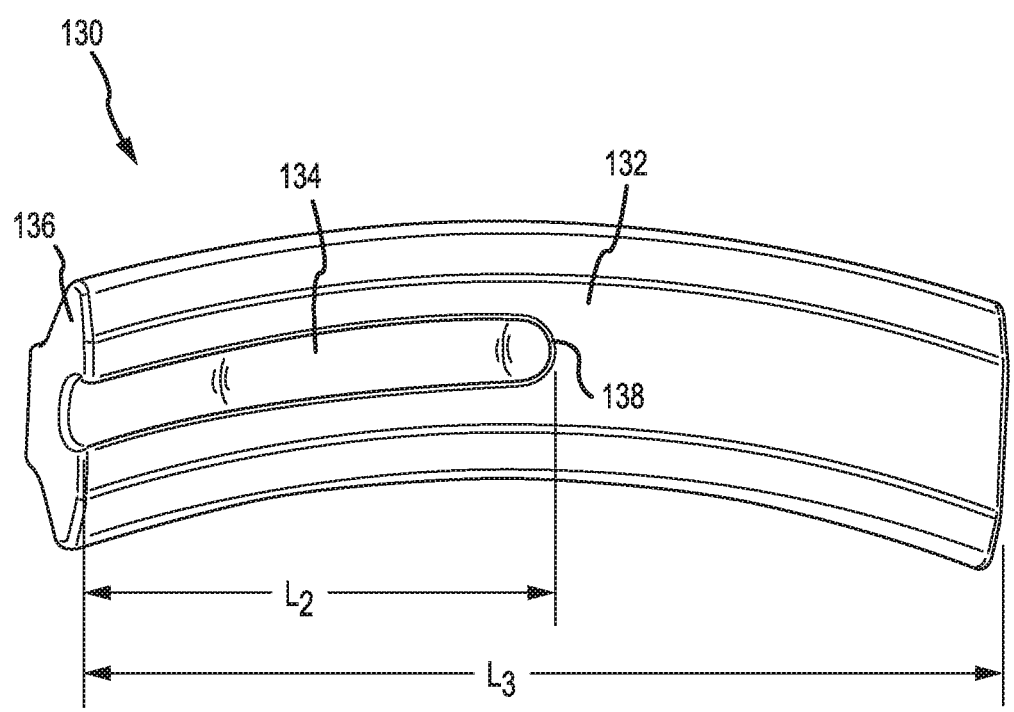
FIG. 3 illustrates a cross-sectional view of an attachment root with a trench extending at least half the axial length of the attachment root, in accordance with various embodiments.

In various embodiments, height Hi and width $W_1$ may be equal. For example, height Hi and width $W_1$ may each be a half inch (1.27 cm). The height Hi, width $W_1$, and length $L_1$ of trench 104 may be selected based on a desired flexibility. A greater height Hi, width $W_1$, and/or length $L_1$ will result in greater flexibility compared to a trench with smaller dimensions. In that regard, trench 104 having a greater volume may result in increased flexibility compared to a trench 104 having lower volume. With reference to FIG. 3, attachment root 130 is shown with trench 134 in surface 132. Trench 134 may extend from leading surface 136 to end surface 138 with the length L2 of trench 134 being at least half length $L_3$ of attachment root 130. In various embodiments, trench 134 may extend across attachment root 130 with length L2 equal to length $L_3$.

Figure 4A:
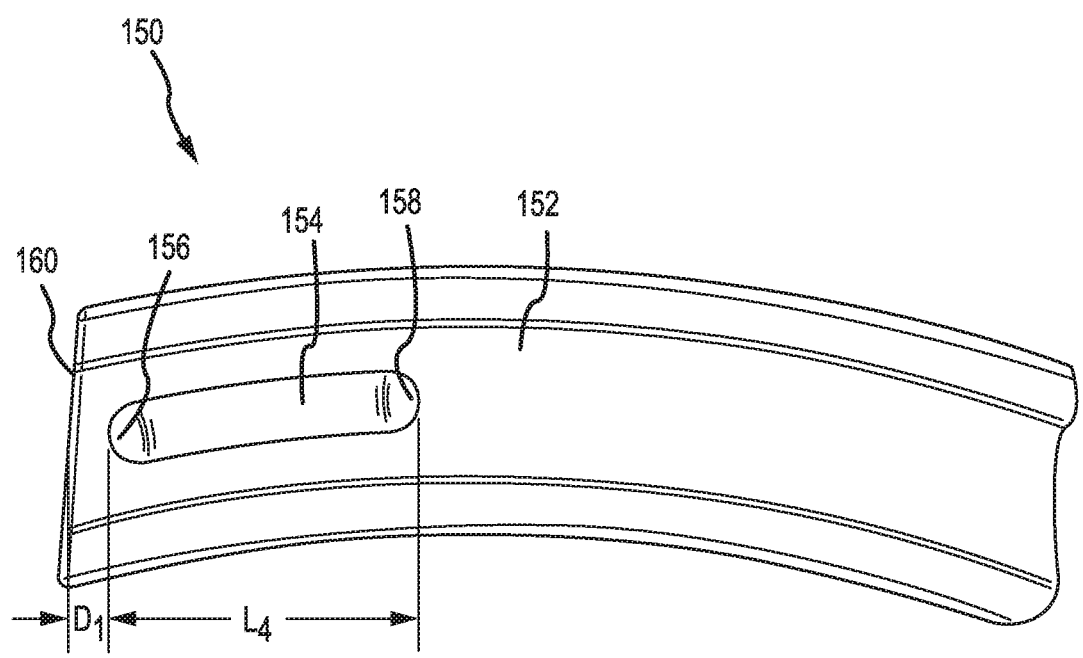
FIG. 4A illustrates an attachment root with a trench offset from the leading edge of the attachment root, in accordance with various embodiments.
Figure 4B:
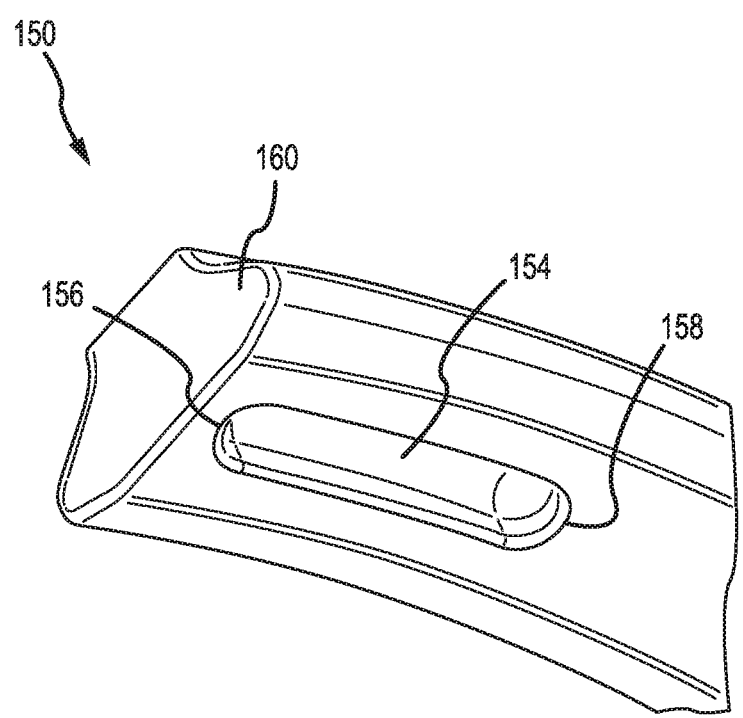
FIG. 4B illustrates a perspective view of an attachment root with a trench offset from the leading edge of the attachment root, in accordance with various embodiments.

With reference to FIGS. 4A and 4B, attachment root 150 is shown with a trench 154 offset a distance Di from leading edge 160 of attachment root 150. A full hoop of material around trench 154 with trench 154 offset from leading edge 160 may be stiffer than trench 104 (of FIG. 2A) with an opening at the leading edge. In various embodiments, a leading surface 156 of trench 154 may begin distance Di from leading edge 160. Leading surface 156 may be a spherical surface to limit stress concentrations. Trailing surface 158 of trench 154 may be a spherical similar to leading surface 156. Trench 154 may comprise a cylindrical trough extending between leading surface 156 and trailing surface 158. The length L4 of trench 154 may be selected to achieve a suitable level of flexibility for attachment root 150. Trench 154 may have a cross section of the same shape and size as trench 104 in FIG. 2C.

Figure 5A:
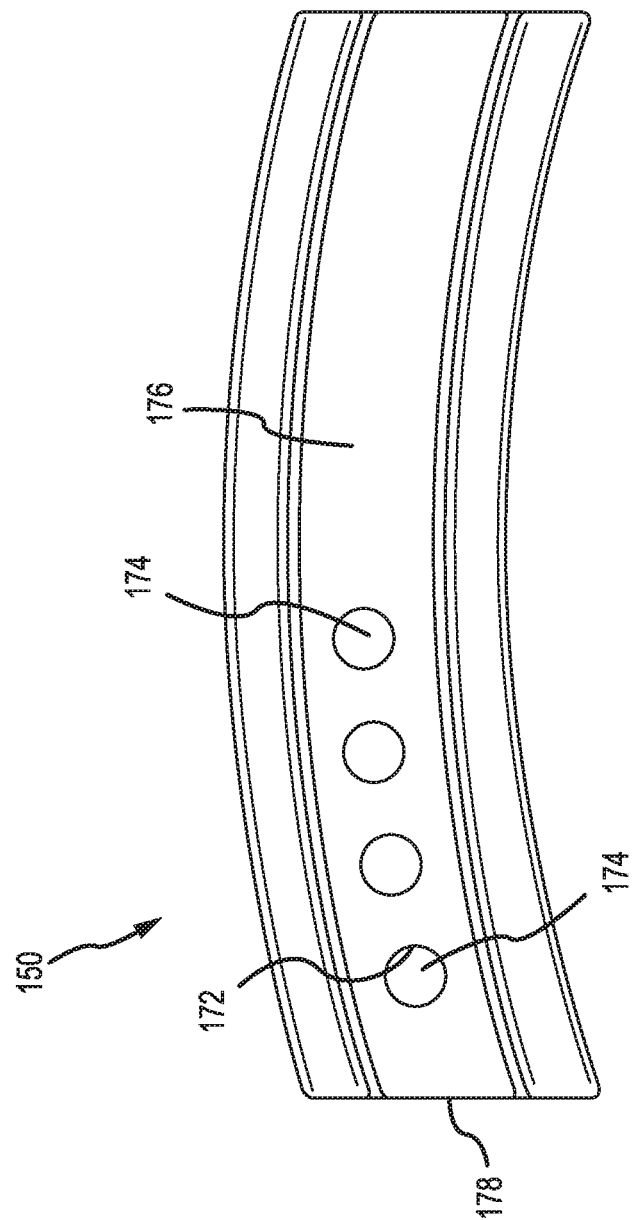
FIG. 5A illustrates an attachment root with multiple recesses formed in the attachment root, in accordance with various embodiments.
Figure 5B:
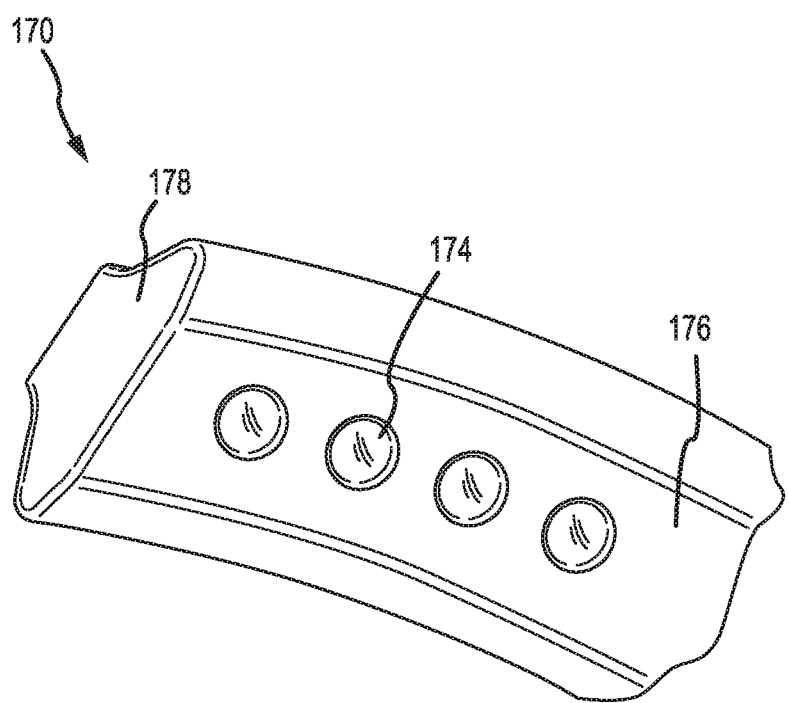
FIG. 5B illustrates a perspective view of an attachment root with multiple recesses formed in the attachment root, in accordance with various embodiments.

With reference to FIGS. 5A-5B, attachment root 170 is shown with recesses 174 in surface 176, in accordance with various embodiments. Recesses 174 may be disposed in a forward portion of surface 176. Recesses 174 may also be offset from leading edge 178 similar to trench 154 of FIG. 4A. Recesses 174 may further have a cross section as illustrated with reference to trench 104 in FIG. 2C. The walls 172 defining recess 174 are illustrated as circular and/or spherical, though a square geometry, rectangular geometry, elliptical geometry, or other shaped geometry may be effective as well. The circular geometries without sharp corners may experience lower stress concentrations than angular geometries. The numbers of and dimensions of recesses 174 may be selected to attain a suitable flexibility for attachment root 170.

An attachment root with recesses formed in the attachment root may provide reduced strain concentrations in response to an impact event. Added flexibility may allow a fan blade to give and spread the impulse of the impact event over a greater time period at lower force. In that regard, an attachment root with a trench formed in the attachment root may be resistant to damage resulting from impact events.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fan blade, comprising:
   a leading edge;
   an attachment root extending aft of the leading edge; and
   a first spherical recess formed in a bottom surface of the attachment root and offset from the leading edge, wherein the height of the first spherical recess equals the width of the first spherical recess; and
   a second spherical recess formed in the bottom surface of the attachment root and offset in an aft direction from the first spherical recess.

2. An attachment root, comprising:
   a leading edge;
   a dovetail extending aft of the leading edge; and
   a first spherical recess formed in a bottom surface of the dovetail and offset from the leading edge, wherein the height of the first spherical recess equals the width of the first spherical recess; and
   a second spherical recess formed in the bottom surface of the attachment root and offset in an aft direction from the first spherical recess.

3. A gas turbine engine, comprising:
   a compressor section configured to rotate about an axis;
   a combustor aft of the compressor section;
   a turbine section aft of the combustor and configured to rotate about the axis; and
   a fan forward of the turbine section comprising a blade, wherein:
      a first spherical recess is formed in a bottom surface of an attachment root of the blade and offset from a leading edge of the blade, wherein the height of the first spherical recess equals the width of the first spherical recess; and
      a second spherical recess formed in the bottom surface of the attachment root and offset in an aft direction from the first spherical recess.

\* \* \* \* \*